United States Patent [19]
Bagley

[11] Patent Number: 5,211,358
[45] Date of Patent: May 18, 1993

[54] AIRFOIL DEPLOYMENT SYSTEM FOR MISSILE OR AIRCRAFT

[75] Inventor: Cloy J. Bagley, Fountain Valley, Calif.

[73] Assignee: General Dynamics Corporation, Pomona, Calif.

[21] Appl. No.: 699,031

[22] Filed: May 13, 1991

[51] Int. Cl.$^5$ .................. B64C 3/56; B64C 5/12
[52] U.S. Cl. ................... 244/3.270; 244/49; 244/75 R
[58] Field of Search ............. 244/213, 75 R, 49, 3.28, 244/3.27, 3.29

[56] References Cited

U.S. PATENT DOCUMENTS

| | | | |
|---|---|---|---|
| 2,011,902 | 8/1935 | Leigh | 244/213 |
| 2,120,760 | 6/1938 | Lumiere | 244/213 |
| 2,392,443 | 1/1946 | Youngman | 244/213 |
| 2,977,880 | 4/1961 | Kershner | 244/49 |
| 3,047,257 | 7/1962 | Chester | 244/85 |
| 3,092,355 | 6/1963 | Brown | 244/43 |
| 3,184,187 | 5/1965 | Isaac | 244/43 |
| 3,463,420 | 8/1969 | Butler et al. | 244/46 |
| 3,586,267 | 6/1971 | Sundbag | 244/213 |
| 3,633,846 | 1/1972 | Biggs, Jr. | 244/3.27 |
| 3,695,556 | 10/1972 | Gauzza et al. | 244/3.28 |
| 4,005,655 | 2/1977 | Kleinschmidt et al. | 102/4 |
| 4,364,531 | 12/1982 | Knoski | 244/3.27 |
| 4,520,975 | 6/1985 | Blackhurst | 244/137 |
| 4,549,464 | 10/1985 | Hawkins et al. | 89/1.809 |
| 4,558,645 | 12/1985 | Boeder et al. | 102/489 |
| 4,659,037 | 4/1987 | Unterstein | 244/49 |
| 4,659,038 | 4/1987 | Hoeppner et al. | 244/49 |

*Primary Examiner*—Galen Barefoot
*Attorney, Agent, or Firm*—Leo R. Carroll; Neil Martin

[57] ABSTRACT

A deflated airbag is located on the outside of a missile or other vehicle beneath a folded, pivotally mounted airfoil member prior to launch, and a supply of pressurized gas is connected to the interior of the airbag via a suitable valve. After launch, or after lowering of a launch platform in the case of launch from an aircraft, an actuator such as an acceleration sensing device or timing device opens the valve, supplying gas to inflate the bag and simultaneously urge the airfoil into an extended, working position. After the airfoil is locked in its extended position, the airbag rapidly deflates and may be dropped off or retracted. Where more than one airfoil is to be deployed, separate airbags are located beneath each of the folded airfoils and a common gas supply is connected to all of the airbags.

12 Claims, 3 Drawing Sheets

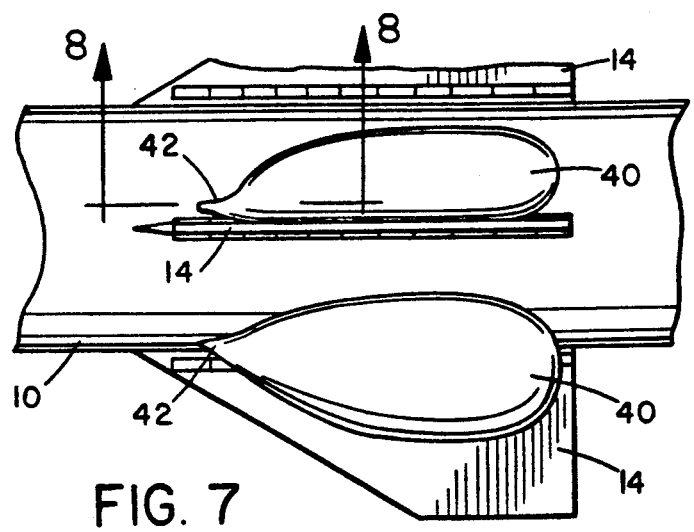
FIG. 7
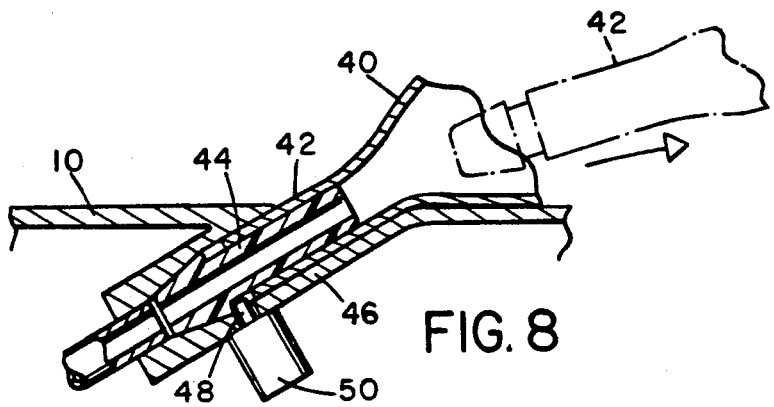
FIG. 8
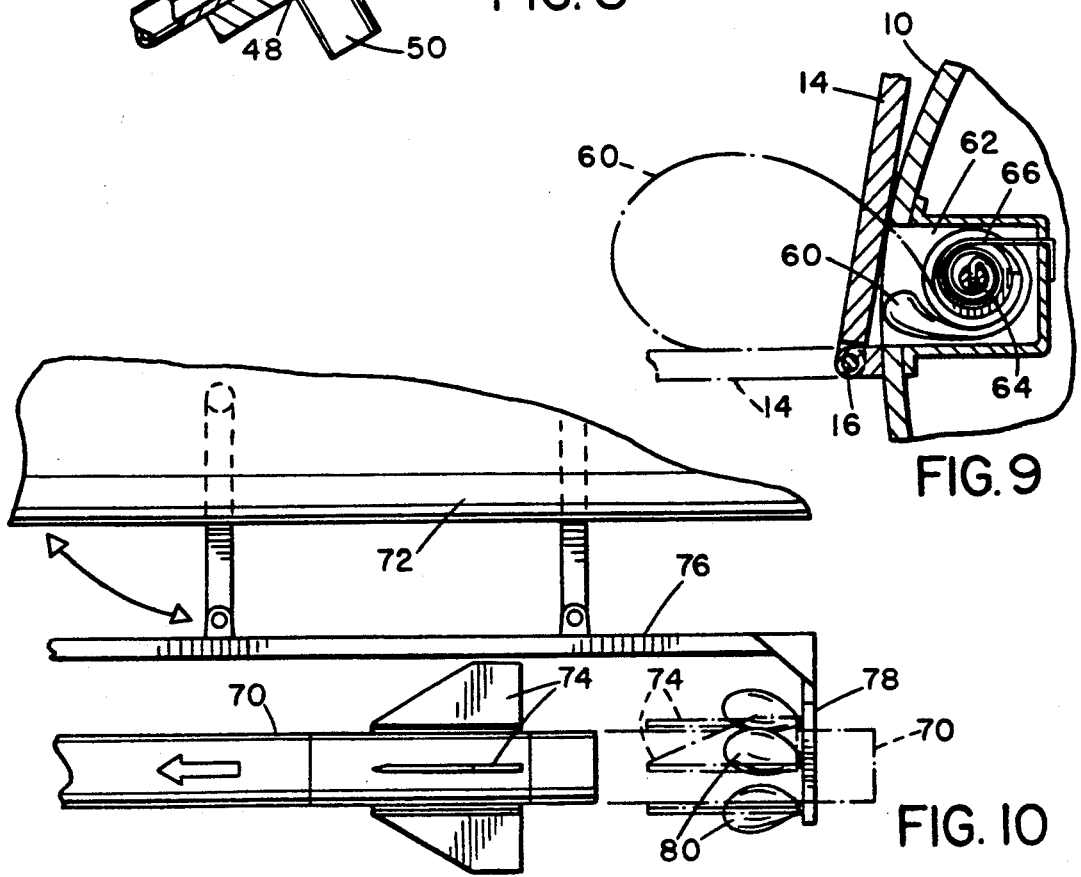
FIG. 9
FIG. 10

AIRFOIL DEPLOYMENT SYSTEM FOR MISSILE OR AIRCRAFT

BACKGROUND OF THE INVENTION

The present invention relates generally to a deployment system for deploying airfoils such as wings, tails, flaps, fins, canards or aerodynamic surfaces and the like on airborne vehicles from a folded or retracted position into an open, extended position projecting outwardly from the body of the vehicle. Often, the size of airborne bodies must be minimized at launch, for example in case of missiles launched from canisters which must be as small as possible for transportation purposes. Thus, aerodynamic surfaces are commonly folded or retracted at launch.

A wing deploying system using an airbag is described in U.S. Pat. No. 4,659,037 of Unterstein, in which a plurality of Wings are folded or collapsed inwardly through slits into a missile body. The wings are pivoted or slid outwardly by means of a collapsed airbag which is expanded to exert an outward force on the wings, the airbag remaining within the missile body.

SUMMARY OF THE INVENTION

It is an object of the present invention to provide a new and improved airfoil deployment system for airborne vehicles or bodies such as missiles or aircraft.

According to the present invention, an airfoil deployment apparatus is provided, which comprises at least one aerodynamic member having a pivot assembly at one end for pivotally mounting the member on the outside of an airborne vehicle for movement between a retracted position folded substantially flat against the vehicle body and an extended position projecting outwardly from the body, an inflatable bag having a mounting assembly for securing the bag between the vehicle body and the aerodynamic member in the retracted position, and an inflation device such as a pressurized gas source secured to the inflatable bag for inflating the bag and urging the airfoil member into its extended position. A locking device is provided for locking the member in its extended position, and the airbag is preferably of a porous material which leaks gas so that the bag deflates when the gas supply is cut off. Deflation occurs when the airfoil member is locked in its extended position.

Preferably, a series of aerodynamic or airfoil members are deployed around the missile body for pivoting movement about pivot axes extending substantially parallel to the missile center line, with an airbag located beneath each airfoil member in its retracted position.

The airbags may be constructed to be blown off automatically by air pressure when fully extended; or may be dropped off by release of the mounting assembly, for example via a retractable pin. Alternatively, they may be retracted into the missile body, for example by a spring retractor arrangement.

The airbag deployment system allows aerodynamic surfaces to be forced into their open, extended position very quickly and reliably. This is important since the surfaces are typically needed immediately on or after launch for stable flight. Where the missile is to be launched from a launch canister, the bags are carried on the missile body itself and inflated immediately after launch. In an alternative arrangement for use with missiles or other vehicles designed to be launched from internal weapons bays of advanced aircraft, where the missiles are launched using swing down launchers, the airbag system is secured to the launcher and activated while the missile is exposed to airflow but still on the launcher. After launch, the airbag system is retained on the launcher after the missile is fired, and retracted back into the weapons bay with the launcher.

The airfoil deployment apparatus of this invention is simple and effective, and takes up minimal space within a missile body since the airbags are located externally.

BRIEF DESCRIPTION OF THE DRAWINGS

The present invention will be better understood from the following detailed description of a preferred embodiment of the invention, taken in conjunction with the accompanying drawings, in which like reference numerals refer to like parts, and in which:

FIG. 7 is a view similar to FIG. 2, showing an alternative airbag arrangement;

FIG. 8 is an enlarged sectional view taken on line 8—8 of FIG. 7;

FIG. 9 is a view similar to FIG. 4, showing a retractable airbag arrangement; and FIG. 10 is a side elevation view of a configuration in which the airbags are retained on the launcher.

DESCRIPTION OF THE PREFERRED EMBODIMENTS

Figure 4:
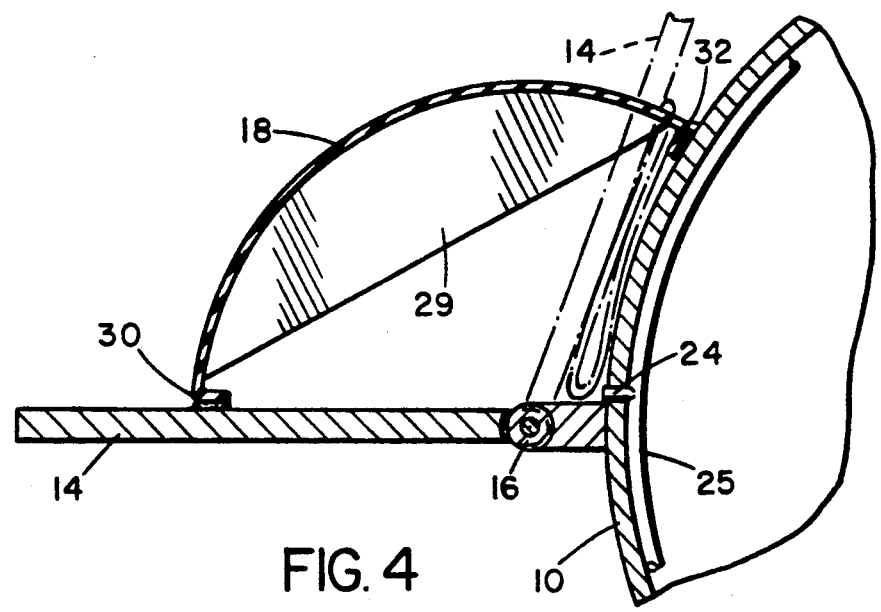
FIG. 4 is an enlarged sectional view taken on line 4—4 of FIG. 2.
Figure 5:
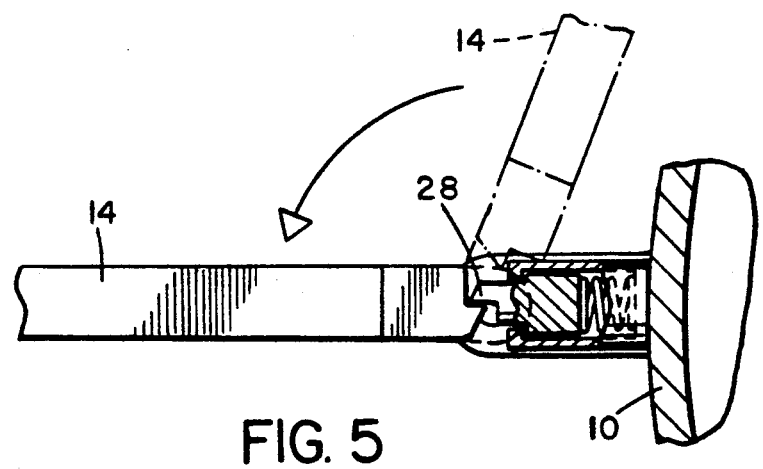
FIG. 5 is an enlarged view similar to a portion of FIG. 3, showing a suitable latch arrangement for locking a fin in extended position.
Figure 6:
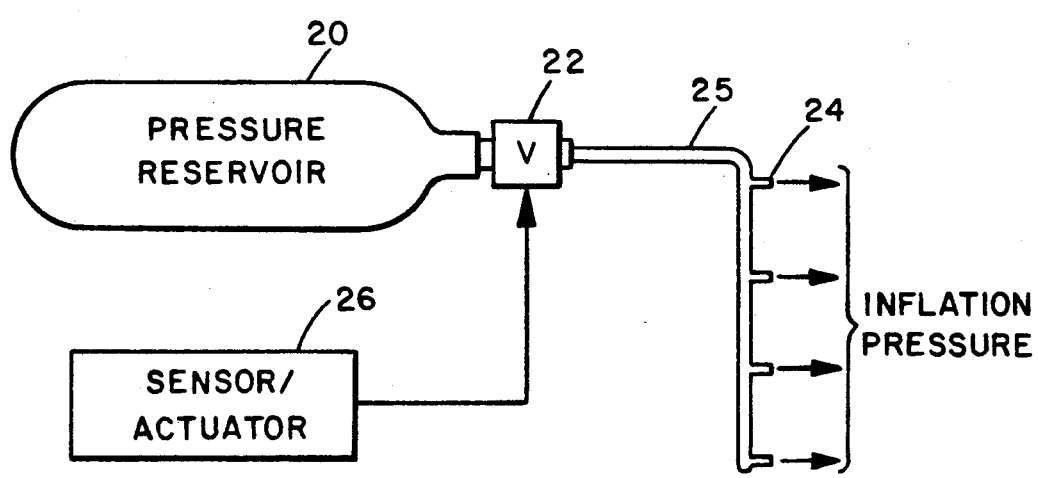
FIG. 6 is a diagram of one arrangement of the fin actuating system.

FIGS. 1 to 5 of the drawings illustrate an airfoil or fin deployment system or apparatus according to a first embodiment of the invention, mounted on the body 10 of a missile 12 which is of a type designed to be launched from a launch canister 15. An arrangement of four fins or airfoils 14 are pivotally mounted via pivot mechanisms 16 to the outer body of the missile for pivotal movement about a pivot axis extending parallel to the missile centerline between a retracted or folded position as illustrated in dotted outline in FIGS. 4 and 5, and an extended position projecting outwardly from the missile body as illustrated in FIGS. 1 to 5. The fin deployment apparatus basically comprises an inflatable air or gas bag 18 secured beneath each of the fins 14 in its folded position, and a gas reservoir 20, as illustrated in FIG. 6, which may be suitably mounted within the missile body. As seen in FIG. 6, reservoir 20 has a suitable control valve 22 and outlets 24 connected via suitable pipelines 25 (see FIG. 4) to the interior of each of the bags 18. A suitable sensor or actuator 26 of a conventional nature is secured to valve 22 to control the supply of gas to the bags 18.

Figure 2:
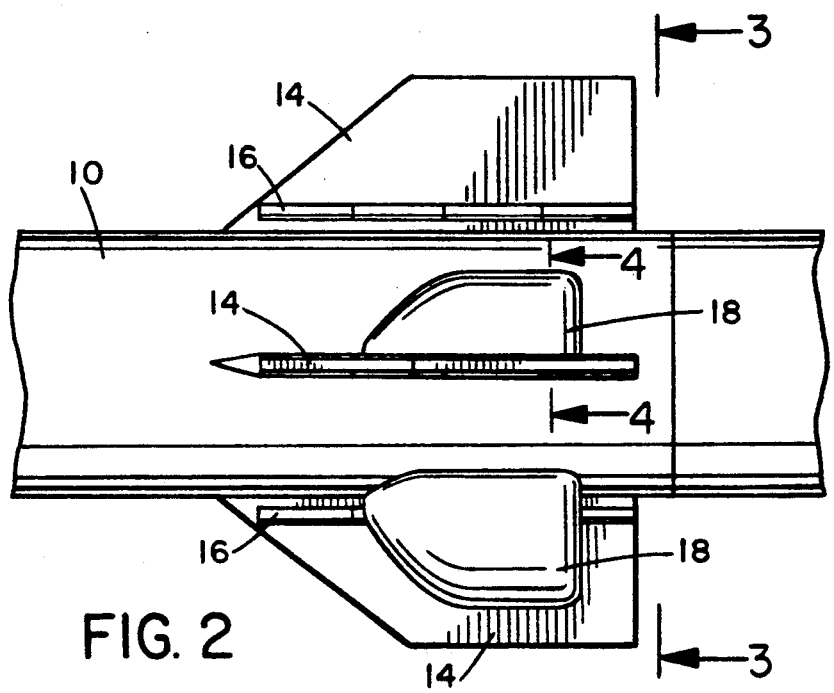
FIG. 2 is an enlarged side elevation view with the fins extended.
Figure 3:
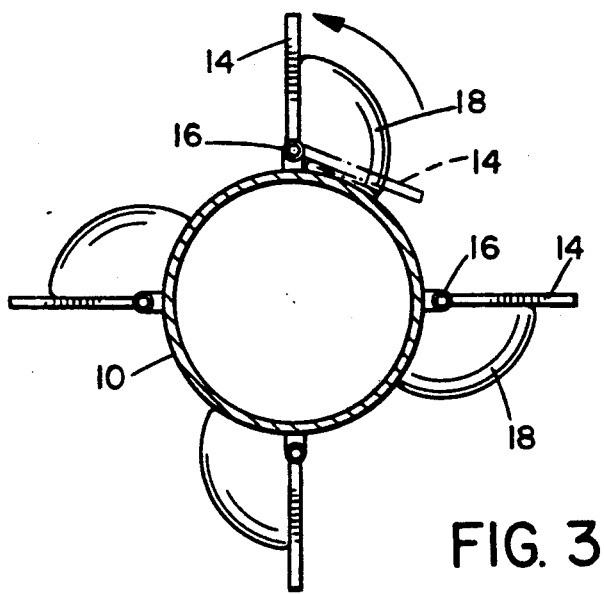
FIG. 3 is a sectional view taken on line 3—3 of FIG. 2.

Each of the gas bags 18 is moved between its collapsed position, illustrated in dotted outline in FIG. 4, and its expanded position illustrated in solid outline in FIG. 4, when gas or air fills the bag. This in turn biases the associated fin or airfoil 14 outwardly into its extended position. A suitable latch mechanism 28 is provided for locking the fin in its extended position, as illustrated in FIG. 5. The gas or airbags 18 may have internal webbing 29, for example as illustrated in FIG. 4, to cause them to inflate to the desired form. As illustrated in FIGS. 2 to 4, one preferred form or shape of the inflated gas bag 18 is a part-cylindrical member having a tapered forward end. Opposite side edges 30, 32 are secured to the undersurface of the airfoil member 14 and to the outer surface of the missile body, respectively, as illustrated in FIG. 4, and expansion of the bag will therefore pivot the airfoil member 14 outwardly away from the body.

The bags will be of a suitable, porous material, for example materials conventionally used in automobile gas bags. The material must be strong enough to withstand the anticipated acceleration forces on launch. The internal webbing 29 provides additional strength.

Figure 1:
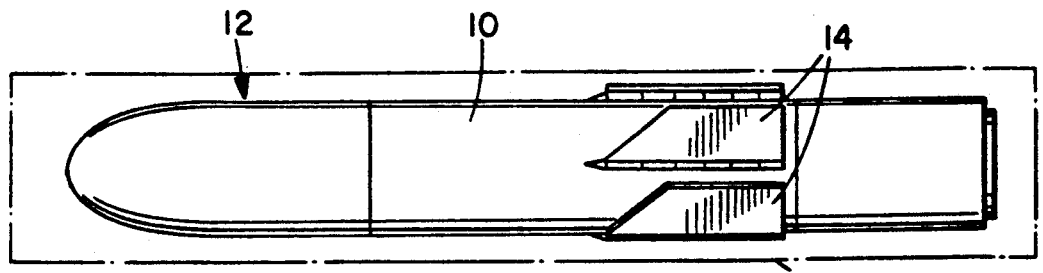
FIG. 1 is a side elevation view of a typical missile in a canister, with the fins folded incorporating a fin deployment system according to a preferred embodiment of the invention.

When the fins or airfoils are folded as illustrated in FIG. 1 and in dotted outline in FIG. 4, the bags 14 will also be folded and located between the respective airfoil and outer surface of the missile. This allows the missile body to be loaded into a cylindrical launch canister 15 of minimal dimensions. Upon exiting the launch canister, the surfaces or airfoils 14 have to be forced into their extended, working position as quickly as possible, since the missile relies on them for stable flight. The forces required to extend the airfoils can be relatively large, dependent on the launch conditions.

The actuator 26 for opening valve 22 to supply gas to the bags 18 may comprise an autopilot, a timing device, an acceleration sensing device, or the like. On actuation of valve 22, high pressure gas is supplied via outlets 24 and pipelines 25 to the interior of each bag 18. The high pressure gas to inflate the airbags could be provided by a gas generator or it could come from a high pressure gas storage vessel, as illustrated in FIG. 6. The bags will fill rapidly with gas and will expand into their expanded configuration, simultaneously forcing the attached airfoil members outwardly into their extended, working positions, as illustrated in FIGS. 2, 3 and 4. After the surfaces have been locked in their open position by latch members 28, the valve 22 will be shut by a suitable signal from actuator 26. Since the bag material is porous, gas will rapidly leak out of the bags, causing them to deflate rapidly. Alternatively, retractable bolts or the like may be used to positively release the bags, or they may be retracted into a suitable cavity within the missile body if desired, as discussed below in connection with the modified embodiments of FIGS. 7 to 9.

This apparatus takes up minimal space within the missile body since he air or gas bag is located external to the missile body, and is simply placed beneath the aerodynamic surface or airfoil when folded. The apparatus is simple and reliable.

FIGS. 7 and 8 illustrate a modified embodiment of the deployment apparatus where each airbag 40 has a balloon like inlet or neck 42 which is adhered to an air inlet stem 44 which is held in place in a suitable air supply socket 46 formed on the missile body 10, as illustrated in FIG. 8. The air stem 44 is held in place in socket 46 via a retractable pin 48 connected to solenoid 50. Once the airfoils or fins 14 have been extended and locked in position, each solenoid 50 retracts its respective pin, releasing all of the airbags, which are blown off the missile body by the oncoming air flow. This arrangement is suitable for ground or sea launched missiles with the airbags dropped in such a manner that they would land clear of the launcher area.

FIG. 9 illustrates another alternative arrangement in which each airbag 60 is retracted into a suitable recess 62 in the missile body 10 once deflated, by winding the bag onto a storage roller 64 via a spiral spring 66 which rotates roller 64 to retract the airbag once it is deflated. This arrangement would be used, for example, in situations where the airbags could not be dropped off the missile body without causing a potential hazard to other aircraft flying in the area or where dropping of the airbags could potentially interfere with operation of a launch aircraft, where the missile is launched from an aircraft rather than from the ground.

FIG. 10 illustrates a modified deployment apparatus for use where a missile or other vehicle 70 is to be launched from a launch aircraft 72 rather than from a canister. The aerodynamic surfaces or airfoils 74 of such vehicles are generally folded prior to launch for load out efficiency and space conservation inside the launch aircraft. In this arrangement, the missile 70 is mounted on a swing down type launcher 76 of a conventional nature. The launcher is lowered from an internal storage space in the aircraft by a trapeze mechanism into the launch position illustrated in FIG. 10. The tail of the missile is located in a rear end frame 78 of the launcher prior to launch, as illustrated in dotted outline in FIG. 10, and the pivotally mounted airfoils 74 are folded down against the missile body while stowed in the aircraft and as the launcher is lowered into the launch position.

A series of airbags 80 are secured to the rear frame 78 of the launcher 76, and each airbag is located between the missile body and a respective one of the folded airfoils or flaps 74 when deflated prior to launch. The airbags are connected to a suitable supply of pressurized gas (not illustrated) in a similar manner to that illustrated in FIG. 6 for the previous embodiments. Once the launcher has been folded down or lowered and the missile is exposed to oncoming airflow, an actuator opens a valve connecting the gas supply to the airbags, and the airbags inflate to open the airfoils 74 into the extended position illustrated in solid outline in FIG. 10. On launch, the missile will be ejected or fired away from the launcher while the airbags remain tethered in place. If tethering the airbags to the launcher could potentially cause a problem to the operation of the launch aircraft, the airbags may alternatively be mounted on the missile itself as in the previous embodiments.

Although some preferred embodiments of the invention have been described above by way of example only, it will understood by those skilled in the field that modifications may be made to the disclosed embodiment without departing from the scope of the invention, which is defined by the appended claims.

I claim:

1. An airfoil deployment apparatus for a missile or other airborne vehicle, comprising:
    at least one aerodynamic airfoil member having pivot means at one end for pivotal attachment to the outer surface of an airborne vehicle for movement between a retracted position adjacent the vehicle body and an extended position projecting outwardly from the vehicle body;
    at least one inflatable bag;

securing means for securing the inflatable bag between the outer surface of the vehicle body and the airfoil member in the retracted position;

inflating means for inflating said inflatable bag into an expanded position biassing said airfoil member into its extended position, said inflatable bag projecting outwardly from the external surface of said vehicle body in said expanded position and comprising means for bearing directly against a surface of said airfoil member as it moves from said retracted position up to said extended position;

control means for controlling operation of said inflating means to inflate said inflatable bag; and locking means for locking said airfoil member in its extended position.

2. The apparatus as claimed in claim 1, further including release means for deflating said inflatable bag when said airfoil member is extended.

3. The apparatus as claimed in claim 1, wherein said pivot means comprises means for pivotally securing said airfoil member to said airborne vehicle for pivotal movement about a pivot axis extending substantially parallel to a centerline of the vehicle.

4. The apparatus as claimed in claim 1, wherein said inflatable bag has a first edge secured to an undersurface of said airfoil member at a location spaced from said pivot means, and a second, opposite edge for securing to the outer surface of said airborne vehicle.

5. The apparatus as claimed in claim 1, wherein the bag is of part cylindrical shape when inflated, with a central axis extending parallel to the centerline of the vehicle.

6. The apparatus as claimed in claim 1, wherein said inflatable bag has an inlet opening for supplying gas to the bag and said securing means comprises means for securing said inlet opening to a launch mechanism of a launch aircraft with said bag extending between the body and folded airfoil of a vehicle to be launched from said launch mechanism.

7. A missile, comprising:

a generally cylindrical missile body;

a series of spaced airfoil members each pivotally mounted at one end to the outer surface of the missile body for pivotal movement about a pivot axis extending substantially parallel to the central longitudinal axis of the missile between a folded position and an extended position projecting outwardly from the missile body, the airfoil members being secured at spaced intervals about an annular portion of the missile body;

a series of inflatable gas bags, each bag being secured beneath a respective one of said airfoils in its folded position between the airfoil and the outer surface of the missile;

a supply of pressurized gas located within the missile body;

pipelines connecting the supply to each of the gas bags;

a valve in the pipeline for controlling the supply of gas to each gas bag;

an actuator for opening the valve at a predetermined time; and each gas bag being inflatable into an inflated configuration urging the associated airfoil into its extended, working position.

8. The missile as claimed in claim 7, including control means for cutting off the gas supply to each gas bag when the airfoils are extended and allowing said gas bags to deflate.

9. The missile as claimed in claim 8, including retraction means for retracting said gas bags into the missile body when deflated.

10. The missile as claimed in claim 7, including a releasable securing mechanism releasably securing each gas bag to the missile, and control means for operating said mechanism to release each gas bag when said airfoils are extended.

11. A method of deploying at least one airfoil on an airborne vehicle after launch, comprising the steps of:

locating a deflated gas bag beneath the airfoil in a folded position adjacent the outer surface of an airborne vehicle prior to launch;

launching the vehicle;

supplying gas to the interior of the gas bag under predetermined conditions after launch;

inflating the bag into a fully inflated configuration and simultaneously urging the airfoil into an extended, outwardly projecting, working position;

locking the airfoil in its extended position; and deflating and dropping off the gas bag from the vehicle.

12. A missile, comprising:

a generally cylindrical missile body having an outer, generally cylindrical surface;

a series of spaced airfoil members each pivotally mounted to the outer surface of the missile body for pivotal movement between a retracted position adjacent the missile body and an extended position projecting outwardly from the missile body;

a series of inflatable gas bags, each bag being secured between a respective one of said airfoils in its retracted position between the airfoil and the outer surface of the missile;

inflating means for inflating each of said inflatable gas bags into an inflated position projecting outwardly from said outer surface and urging said airfoils into said extended positions, said gas bags extending between said outer surface of the missile and the respective extended airfoil in their inflated positions;

control means for controlling operation of said inflating means to inflate said inflatable bags; and locking means for locking said airfoils in said extended positions.

* * * * *